United States Patent Office 3,375,071
Patented Mar. 26, 1968

3,375,071
GERMANIUM SELENIDES AND PROCESSES FOR THEIR PRODUCTION
Howard S. Young, Chadds Ford, Pa., assignor to E. I. du Pont de Nemours and Company, Wilmington, Del., a corporation of Delaware
No Drawing. Filed Dec. 23, 1964, Ser. No. 420,776
6 Claims. (Cl. 23—204)

ABSTRACT OF THE DISCLOSURE

Two new crystal forms of germanium diselenide can be made by heating the elements together at pressures greater than 30 kilobars. A black crystalline form having fibrillar cleavage has semiconductive and photoconductive properties. An orange-yellow tetragonal form also has photoconductive properties.

Description of the invention

This invention relates to new crystal forms of inorganic chemical compounds and is more particularly concerned with new germanium selenides, and their synthesis under high pressures and temperatures. One such new crystal structure is a fibrillar germanium selenide having an atom ratio of germanium to selenium of between about 1/1.8 to 1/2.0 which is characterized by a crystal structure that fibrillates, i.e., cleaves readily to fibrils, and exhibits semiconductor and photoconductor properties.

The literature has described several methods for preparing germanium selenides. One method involves the reaction of hydrogen selenide with a tetravalent germanium compound while another method involves heating stoichiometric amounts of the elements to a melt, preferably in an evacuated silica tube. However, none of the prior methods employ high pressures. In addition, the prior methods result in germanium selenides that have an orthorhombic crystalline structure. For example, orthorhombic GeSe has been found to have cell constants of $a=4.40$, $b=10.82$, $c=3.85$ A., with a space group of Pnma, a density of 5.52 and only very slight indications of photoconductivity. Orthorhombic $GeSe_2$ has been found to have cell constants of $a=6.94$, $b=12.20$, $c=22.99$ A., a density of 4.68 and a resistivity at room temperature of about $10^{12}$ ohm-cm. However, no germanium selenides have been reported having a crystalline structure which results in fibrillation and which have good photo-conduction properties.

Therefore, it is an object of this invention to provide new crystalline forms of germanium selenides, to provide fibrillar germanium selenides, to provide germanium selenides having good photoconductor and insulator properties, and to provide a method for preparing them. These and other objects will become apparent hereinafter.

The objects are accomplished by reacting a mixture of germanium and selenium in an atom ratio of at least 1 to 1.8 and generally in the range of from 1 to 1.8 to 1 to 3 at temperatures of at least 500° C. and generally 600 to 1300° C. under a pressure of at least 30 kilobars and generally 60–100 kilobars. A new germanium selenide of primary interest crystallizes, below about 600° C., in small fibrillar black blocks or extended rods which are characterized by having a fibrillating cleavage, i.e., readily forms fibrils as small as 0.05 micron in width. The ratio of germanium to selenium for the fibrillating structure is within the range of 1/1.8 to 1/2. The general procedure of this invention further results in the production of a new tetragonal orange-yellow germanium diselenide which has insulator properties along with photoconductive properties. The yield of the latter compound is generally increased when lower pressures are used, e.g., 30–60 kb. at high temperatures.

For purposes of simplicity, the new forms of germanium selenide are referred to in the following description as the diselenide although stoichiometrically some of the compounds may not analyze exactly in the 1 to 2 elemental ratio. Nonstoichiometric inorganic compounds are well recognized, see, e.g., the Wadsley chapter in Mandelcorn, "Non-stoichiometric Compounds," Academic Press, New York, N.Y. (1964) pages 98–209.

To produce the fibrillar compounds of the invention, a cold pressure of 60–65 kilobars is preferred. At this initial pressure the reaction is preferably carried out at 800–1300° C. and the product is then cooled slowly (about 150° per hour) to 300–600° C., followed by cooling to room temperature by simply cutting off the heating power.

The reaction product is a mixture of fibrillar germanium selenide and tetragonal germanium selenide in which the amounts of each depends upon the pressure range selected. They are produced in phases and may be easily separated manually by mechanical means based on the difference in physical properties, such as density, etc.

The time is not critical but will generally be between 2 to 5 hours.

The high pressures used in the method of this invention are obtained by employing a tetrahedral anvil apparatus as described generally by H. Tracy Hall in Rev. Sci. Instr., 29, 267 (1958). The specific embodiment employed is described by E. C. Lloyd et al., Journal of Res., Nat. Bur. Stds., 63C, 59 (1959). This embodiment differs from the Hall apparatus, which employed four rams, in having the motion of three anvils provided through the wedge action of a ring with a conical hole.

The equipment includes a 500-ton hydraulic press, and a support ring large enough to handle an anvil with a triangular face, one inch on edge. In this apparatus, all the experiments, described below, were run in an assembly built into a tetrahedron of pyrophyllite 1.25 in. on edge. The elements of an experimental assembly are illustrated in FIG. 8 of Hall's paper (p. 272).

For a chemical experiment, the cavity through the tetrahedron is fitted with a platinum or graphite heater tube into which a crucible container is inserted. Electrical contact is improved by providing a thin metal cover, usually platinum, between the ends of the heater tube and the metal tabs contacting the anvils. More specific data are given in the examples, below.

To establish the quantity of pressure employed in the method of this invention, it was necessary to correlate an intensive variable measured in the apparatus developing the pressure with one or more fixed points or calibration points. Thee most extensively employed physical effect as a function of pressure is that of electrical resistivity. A change in this physical property for a calibrating substance usually accompanies a first order structural change initiated by pressure.

The experimental tetrahedral anvil facility was calibrated using bismuth, thallium and barium as the calibrating materials at room temperature. In all cases, silver chloride was the surrounding medium for the wire and the combination was inserted in the 1.25 in. edged tetrahedron.

The most recent values for the fixed points that justify ready acceptance appear in the 1963 edition of the American Institute of Physics Handbook, p. 443. These are tabulated below (all values for ambient temperature).

| | Kilobars |
|---|---|
| Bismuth I→II | 25.37±.02 |
| Bismuth II→III | 26.96±0.18 |
| Thallium II→III | 36.69±0.11 |
| Barium II→III | 59.0±1.0 |

All compressions in the following examples were made on the cold assembly and charges were heated to the temperature indicated by the appropriate thermocouple. Press loads are given as a single value and the most probable pressure given as a range. The pressure unit is a bar, equivalent to $10^6$ dynes/cm.$^2$. The larger unit, a kilobar, is consistently shown. No pressure correction for thermocouple behavior has been introduced, standard E.M.F. tables for 1 atm. being employed. Additional details appear in the following examples, which illustrate specific embodiments of this invention.

*Example 1*

A mixture of finely divided germanium and selenium was prepared in the atom ratio 1:2.1 (67.7 atom percent Se). An aliquot of 0.288 gram was compacted in two pressings at 60 tons/sq. in. in a die to form a cylindrical charge 0.362 in. long to be inserted into a 0.120 in. diameter boron nitride crucible. This crucible plus a boron nitride cover was surrounded by a close fitting graphite heater and fitted along with a thermocouple into a 1¼ in. tetrahedron fabricated out of pyrophyllite. Metal tabs were provided to effect electrical contacts external to the tetrahedron. A thermocouple of Pt/6% Rh–Pt/30% Rh was assembled with the junction situated immediately next to the center of the graphite heater measured along the length. Thermocouple leads were led through edges of the tetrahedron.

The initial cold pressure was 60–65 kilobars (350 tons press load) and the reaction mixture was heated to 1300° C. and held at this temperature for two hours. Subsequently the reaction mixture was cooled approximately 150° C./hr. to 550° C. and quenched.

Examination of the product indicated essentially no involvement of the boron nitride crucible. A significant part of the product comprised very dark brown fibrous bundles which were not attacked by water or cold concentrated HCl over fifteen hours. Optical examination in polarized light indicated very small fibrils (400×) which were birefringent and which transmitted red light.

A section of the fibrous bundles was submitted for measurement of electrical properties and found to be a semiconductor with an activation energy of 0.6 e.v. and a photoconductor.

A separate section was examined under an electron microscope at magnifications up to 50,000 times. Fibrils as small as 0.05 micron in width were observed, with lengths of up to about 2 mm.

Powder pattern X-ray results are listed as follows in Table I:

TABLE I

| Observed spacing, A.: | Intensity |
|---|---|
| 6.91 | $M_3$ |
| 6.06 | [1] $M_2$ |
| 5.37 | $M_3$ |
| 3.95 | [1] $M_2$ |
| 3.45 | $M_3$ |
| 3.35 | $M_3$ |
| 3.14 | $M_3$ |
| 3.08 | $M_3$ |
| 3.03 | [1] S |
| 2.88 | $M_3$ |
| 2.24 | [1] $M_1$ |
| 1.83 | [1] $M_2$ |
| 1.76 | [1] $M_2$ |
| 1.67 | $M_3$ |

[1] Indicates the stronger characteristic lines in the front reflection.

The letter S designates the strongest line recorded; $M_1$, $M_2$, $M_3$, and $M_4$ are lines of medium intensity, the order of intensity decreasing with increasing numerical sequence.

Electron probe analysis gave a composition for this phase of Ge 32.9 wt. percent, Se 68.1 wt. percent. Elemental analyses gave a composition of Ge 32.0%, Se 69.5%. Density determination at 25° C. was 4.806. Photoconduction occurs at wave lengths shorter than 3650 A. to as long as 10500 A. Ratios of resistance in darkness to resistance in light ranging from 5 to over $10^4$ have been obtained for fibrils about 200 microns long and a few microns thick. The fibrils are malleable and easily bent.

*Example 2*

A mixture of finely divided germanium and selenium was prepared in the atom ratio 1:3.0 (75.0 atom percent Se) and an aliquot of 0.142 gram was compacted in one pressing at 60 tons/sq. in. to form a cylindrical charge 0.180 in. long to be inserted into a 0.120 in. diameter boron nitride crucible. This crucible with a boron nitride cover was centered in a close fitting graphite heater 0.460 in. long and thermal insulators of pyrophyllite provided to fill the balance of the heater cavity. The usual thermocouple was provided.

The initial cold pressure was 60–65 kilobars and the heating schedule was (a) 1300° C.—2 hours, (b) cooling at 175° C./hour to 550° C., and (c) quench.

This product could be examined by opening the boron nitride container longitudinally. A significant part comprised blocks of fibrils which were sampled for an X-ray powder pattern. A thin section was also obtained for micro-examination under polarized light and a thin ribbon-like piece gave a clear biaxial interference figure. Slight pressure subsequently applied to this thin fragment effected fibrillation to a group of essentially parallel bundles.

A sample was also characterized as to electrical resistivity at 25° C. ($2 \times 10^6$ ohm cm.) and the photoconductivity observed. The dark to light resistance ratio was measured as 140.

*Example 3*

A separate aliquot of the mixture prepared for Example 1 was prepared for insertion into a small boron nitride crucible similar to that used in Example 2. The charge was 0.165 gram of a 1:2.1 atom ratio, Ge to Se.

At a cold pressure of 60–65 kilobars the mixture was heated to 900° C., held two hours and cooled at 150° C./hr. to 300° C. prior to a quench. As in previous examples, blocks of fibrillating crystals were recovered and characterized by microscopic examination under polarized light. An X-ray powder pattern showed some lines of unreacted Se and Ge plus many of the characteristic lines for the fibrillating phase.

*Example 4*

Example 1 was repeated with a charge of 0.290 gram (atom ratio 1:2.1). After two hours at 1300° C. under pressure, cooling to 550° C. was effected over five hours.

A block of the fibrillating phase was isolated, checked for optical characteristics and mounted for electron probe microanalysis. The indicated composition was Ge 32.9 wt. percent and Se 68.1 wt. percent. The equivalent atom ratio was Ge:Se=1:1.90.

*Example 5*

The procedure of Example 4 was repeated (charge ratio 1:2.1), but after two hours at 1300° C. and 60–65 kilobars, cooling was extended over 6.7 hours to 300° C. The blocks of fibrillating phase were somewhat longer, probably as a consequence of cooling to a lower temperature.

Example 6

A mixture of germanium and selenium in atom ratio 1:2.1 was prepared as in Examples 1 and 4, but after cold pressuring to 60°–65 kilobars, was heated to 1000° C. Cooling was started after two hours at temperature and continued at about 150° C./hr. to 550° C. Separation of an aliquot of the fibrillating phase was readily effected for a measurement of density. The value at 25° C. was 4.81.

Chemical analysis of a separate aliquot gave Ge 32.0 wt. percent, Se 69.5 wt. percent, equivalent to an atom ratio Ge:Se=1:1.99.

Example 7

An intimate mixture of Ge and Se in the atom ratio of 1:2.1 was prepared as in previous examples and charged into a boron nitride crucible. Cold pressure of 40–42 kilobars (157 tons press load) was applied and the reaction mixture heated to 1200° C. After a holding time of two hours, slow cooling at 150° C./hr. was initiated and carried to a temperature of 550° C.

Examination of the product disclosed a yellowish orange crystalline phase which proved to be uniaxial on examination under polarized light.

X-ray examination of the orange-yellow crystals has established the space group and given the following information:

*Tetragonal system.*—Space group $I\bar{4}2d$, $Z=4$; $a=5.71$ A., $C=9.66$ A.; density (calc.) 4.86; density (measured) 4.87.

The powder patterns agree well with calculated values. The lines characteristic of this structure are tabulated in Table II, below.

TABLE II

| Observed spacing, A. | Intensity |
|---|---|
| 4.92 | [1]S |
| 3.10 | [1]S |
| 2.86 | [1]$M_2$ |
| 2.81 | [1]$M_2$ |
| 2.42 | $M_3$ |
| 2.02 | [1]S |
| 2.00 | $M_3$ |
| 1.87 | $M_3$ |
| 1.84 | [1]S |
| 1.69 | [1]S |
| 1.64 | $M_3$ |
| 1.56 | $M_3$ |
| 1.54 | $M_3$ |
| 1.50 | [1]$M_2$ |
| 1.43 | [1]$M_2$ |

[1] Indicates the stronger characteristic lines in the front reflection.

Property measurements on this germanium diselenide indicate that it is an insulator with resistivity values in the ranges of $3 \times 10^7$ to greater than $2 \times 10^{11}$ ohm cm. There was indication also of photoconductivity, the ratio of resistance, light to dark, being ten.

When resistivity samples were being prepared, it was observed that the structure was thermochromic, with a reversible color change, yellowish orange to red, easily observed as a small soldering iron tip was brought close to the crystal.

Analytical data for a sample show Ge 33.3%, Se 67.7%. Theory for GeSe$_2$ is Ge 31.49%, Se 68.51%.

The germanium and selenium employed in the foregoing examples were obtained commercially. Specifically, the germanium used was Eagle Pitcher first reduction grade while the selenium was 99.99% Kawecki chemical.

The physical properties of the fibrillar germanium selenides, such as powder pattern data, electron probe analysis, photoconduction, etc., are found in Examples 1–6. The physical properties of the tetragonal germanium selenides are found in Example 7.

As indicated in the examples, especially Example 1, the fibrillar germanium selenides and the tetragonal germanium selenides are useful as photoconductors. The photoconduction tests were carried out by preparing slender ribbons of the novel germanium selenides and passing current parallel to the length. The photoconduction properties were found to be comparable with those of conventional photoconductors such as cadmium sulfide. Thus the novel compounds of the invention may be employed as photoconductors in a manner similar to the known cadmium sulfides. In addition to this general use, the fibrillar compositions are useful as semiconductors.

As many apparently satisfactorily different embodiments of this invention may be made without departing from the scope and spirit thereof, it is to be understood that this invention is not limited to the specific embodiments thereof as defined in the appended claims.

The embodiments of the invention in which an exclusive property or privilege is claimed are defined as follows:

1. A germanium selenide wherein the ratio of germanium to selenium is within the range of 1:1.8 and 1:2 characterized by inherent fibrillar cleavage, and wherein the powder X-ray pattern is as follows:

| Observed spacing, A. | Intensity |
|---|---|
| 6.91 | $M_3$ |
| 6.06 | [1]$M_2$ |
| 5.37 | $M_3$ |
| 3.95 | $M_3$ |
| 3.45 | [1]$M_2$ |
| 3.35 | $M_3$ |
| 3.14 | $M_3$ |
| 3.08 | $M_3$ |
| 3.03 | [1]S |
| 2.88 | $M_3$ |
| 2.24 | [1]$M_1$ |
| 1.83 | [1]$M_2$ |
| 1.76 | [1]$M_2$ |
| 1.67 | $M_3$ |

[1] Indicates the stronger characteristic lines in the front reflection.

2. A tetragonal germanium selenide wherein the ratio of germanium to selenium is within the range of 1:1.8 and 1:2 and having a space group of $I\bar{4}2d$, $Z=4$, $a=5.71$ A., and $c=9.66$ A.

3. A process for preparing fibrillar germanium selenides having a ratio of germanium to selenium of between 1:1.8 and 1:2 which comprises subjecting a mixture of germanium and selenium in an atom ratio of at least 1:1.8 of germanium to selenium to a cold pressure of about 60 to 100 kilobars, heating to a temperature of between about 800° C. to 1300° C. while maintaining said pressure, followed by cooling to solidification.

4. A process for preparing tetragonal germanium selenides having a ratio of germanium to selenium of between 1:1.8 and 1:2 which comprises subjecting a mixture of germanium and selenium in an atom ratio of at least 1:1.8 of germanium to selenium to a cold pressure of about 30 to 60 kilobars, heating to a temperature of between about 500° C. to 1300° C. while maintaining said pressure, followed by cooling to solidification.

5. A process for preparing fibrillar germanium selenides having a ratio of germanium to selenium of between 1:1.8 and 1:2 which comprises subjecting a mixture of germanium and selenium in an atom ratio of from 1:1.8 to 1:3.0 to a cold pressure of about 60 to 65 kilobars, heating to a temperature of about 800° C. to 1300° C. while maintaining said pressure followed by cooling to solidification.

6. A process for preparing germanium diselenides having a ratio of germanium to selenium of between 1:1.8 and 1:2 which comprises subjecting a mixture of germanium and selenium in an atom ratio of between 1:1.8 and 1:3.0 to a cold pressure of 30 to 100 kilobars, heating to a temperature of between about 500° C. and 1300° C. while maintaining said pressure and cooling to solidification.

References Cited

Gmelin: "Gmelins Handbuch," Aufl. 8, System No. 45, p. 542, 1958.

Kannewurf et al.: "Acta Crystallographica," vol. 13, 1960, pp. 449–450.
Liu et al.: "Chem. Absts.," vol. 57, 1962, p. 16114.
Liu et al.: "Chem. Absts.," vol. 58, 1963, p. 2904.
Okazaki: "Chem. Absts.," vol. 53, 1959, p. 3827.

OSCAR R. VERTIZ, *Primary Examiner.*

H. T. CARTER, *Assistant Examiner.*